US005733046A

United States Patent [19]

Bellmore et al.

[11] Patent Number: 5,733,046

[45] Date of Patent: Mar. 31, 1998

[54] VEHICLE DOOR CONTROL ROD GUIDE CLIP

[75] Inventors: Charles Sidney Bellmore, Milford; Chester Stanislaus Walawender, Livonia, both of Mich.; Peter Lance Oxley, Ontario, Canada

[73] Assignees: Ford Motor Company, Dearborn, Mich.; Magna International Inc., Canada

[21] Appl. No.: 826,322

[22] Filed: Mar. 27, 1997

[51] Int. Cl.$^{6}$ .................... F16C 29/02

[52] U.S. Cl. .................... 389/37; 384/42

[58] Field of Search .................... 384/37, 42, 7, 384/38, 41

[56] References Cited

U.S. PATENT DOCUMENTS

| | | | |
|---|---|---|---|
| 3,784,242 | 1/1974 | Hill . | |
| 3,848,909 | 11/1974 | Foley . | |
| 4,421,350 | 12/1983 | Gotomyo . | |
| 4,602,887 | 7/1986 | Konchan . | |
| 4,674,780 | 6/1987 | Weinerman et al. . | |
| 5,046,771 | 9/1991 | Dedrich . | |
| 5,535,553 | 7/1996 | Staser et al. | 49/502 |

FOREIGN PATENT DOCUMENTS

| | | |
|---|---|---|
| 88-044178 | 12/1987 | France . |

*Primary Examiner*—Lenard A. Footland
*Attorney, Agent, or Firm*—David B. Kelley

[57] ABSTRACT

An automotive vehicle door handle with a control rod for operation of a door latch has a rod guide clip which provides a reaction force in a direction perpendicular to reciprocating motion of the control rod. The rod guide clip has a base member with a generally planar surface having an opening for receiving the control rod substantially perpendicular therethrough, flexible fingers circumferentially spaced around the opening and extending thereinto for biasing contact with the control rod, retention tabs on the base member circumferentially spaced radially outward of the flexible fingers for contact with a clip flange in the vehicle, and a pair of clip arms extending away from the base member in clipping relationship with the clip flange.

9 Claims, 2 Drawing Sheets

VEHICLE DOOR CONTROL ROD GUIDE CLIP

FIELD OF THE INVENTION

The present invention relates to automobile vehicle door handles in general, and more specifically to anti-rattle devices for a door handle control rod.

BACKGROUND OF THE INVENTION

Many vehicle doors have a latch mechanism, with a latch and a striker, to retain the door in a closed position while covering an access opening. For the door to open, the latch must first be released from the striker. However, the latch and striker are typically on adjacent, non-exposed surfaces when the door is closed, and the latch cannot be directly unlatched from the striker. Indirect latch release is usually accomplished by a door handle, located either exteriorly or interiorly of the vehicle, which operates control members within the door to effect an unlatching motion at the latch mechanism. Since the door handle is usually remotely located from the latch mechanism, these control members often must be configured to accommodate other devices in the door interior, such as a window regulator. Without proper guiding and retention of these connecting members, the door may squeak or rattle when shut or when the vehicle is driven, and a poorly perceived "feel" may develop when the door is opened.

It is known to provide a clip attached to the vehicle for guiding reciprocating motion of a door handle control rod in a door interior. Some prior guide clips require a separate U-clip to retain the guide clip to the vehicle, thus increasing both manufacturing expense and assembly time. It is also known to provide a double 90° bend in the control rod to create a tight fit with the clip to reduce rattle. This arrangement, however, may inhibit smooth control rod operation.

Other devices have addressed rattle concerns, such as in U.S. Pat. No. 5,046,771 (Dedrich), where a shoe 20 is disclosed attached to an inner door panel 14 by feet 34 and 36 that project through an aperture 32. The shoe also includes a slot 50 that allows a rod 24 to be snap fitted into the shoe. A similar rod support structure is disclosed in U.S. Pat. No. 3, 784,242 (Hill). These devices, however, seek to allow the rod to rotate with respect to the vehicle, as well as to guide rod motion in a direction parallel to the plane of the shoe, and are not directed to reciprocating motion perpendicular to the plane of the shoe. Retention of the shoe and retaining the rod are thus accomplished in separate planes, which may lead to separation of the shoe from the vehicle, and to consequent rattle.

There is therefore a need for a vehicle control rod guide clip which provides retention of the clip to the vehicle and an anti-rattle bias to the control rod, both in a generally common plane so as to provide a coplanar reaction force against lateral movement of the control rod when reciprocating perpendicular to the clip.

SUMMARY OF THE INVENTION

The present invention overcomes the disadvantages of the related art by providing a rod guide clip for a door of an automotive vehicle having a door handle with a control rod attached thereto for operation of a door latch, the guide clip arranged so as to provide control rod bias and retention of the clip in a common plane. The clip comprises a base member with a generally planar surface having an opening therein for receiving the control rod substantially perpendicular therethrough. A plurality of flexible fingers are circumferentially spaced around the opening and extend into the opening from the base member in biasing contact with the control rod. Circumferentially spaced radially outward of the plurality of flexible fingers are a plurality of retention tabs on the base member for contact with a mating portion of the vehicle. Extending away from the surface of the base member are a pair of clip arms for clipping the guide clip to the mating portion of the vehicle. The plurality of flexible fingers, the plurality of retention tabs, and the pair of clip arms are located in a generally common plane so as to provide a coplanar reaction force against lateral movement of the control rod perpendicular to the base member.

An advantage of the present invention is a rod guide clip which provides smooth door handle operation while reducing door rattle.

Another advantage of the invention is rod guide clip which eliminates the need for a double 90° control rod bend.

Still another advantage of the present invention is a rod guide clip which provides a control rod bias force coplanar with the means for attaching the clip to the vehicle.

Yet another feature of the present invention is a rod guide clip which snaps into place and locates itself to the vehicle mounting surface.

A feature of the present invention is a rod guide clip which has a tapered guide to enable rod to travel smoothly therethrough.

Yet another feature of the present invention is a rod guide clip having a plurality of flexible fingers, a plurality of retention tabs, and a pair of clip arms located in a generally common plane to provide a coplanar reaction force against lateral movement of a control rod perpendicular to the clip.

BRIEF DESCRIPTION OF THE DRAWINGS

These and other objects, advantages, and features of the present invention will be apparent to those skilled in the vehicle door arts upon reading the following description with reference to the accompanying drawings, in which.

DETAILED DESCRIPTION OF THE PREFERRED EMBODIMENT

Figure 1:
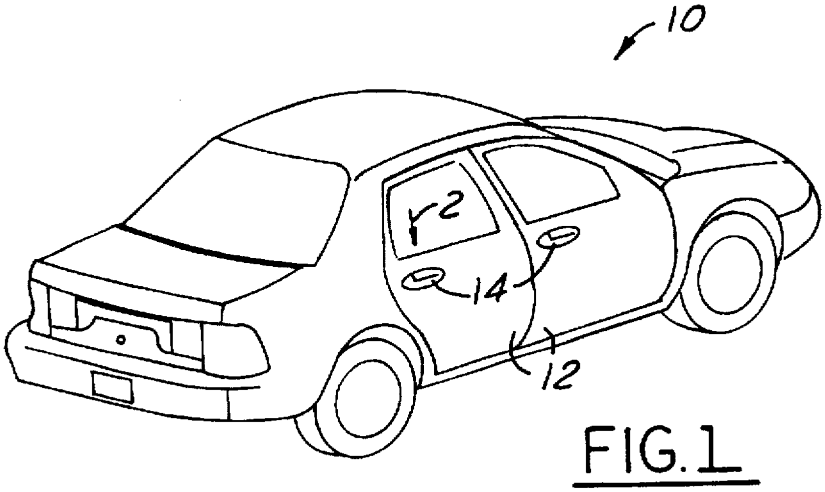
FIG. 1 is a perspective view of an automotive vehicle having a door handle/latch actuation mechanism with a rod guide clip according to an embodiment of the present invention.
Figure 2:
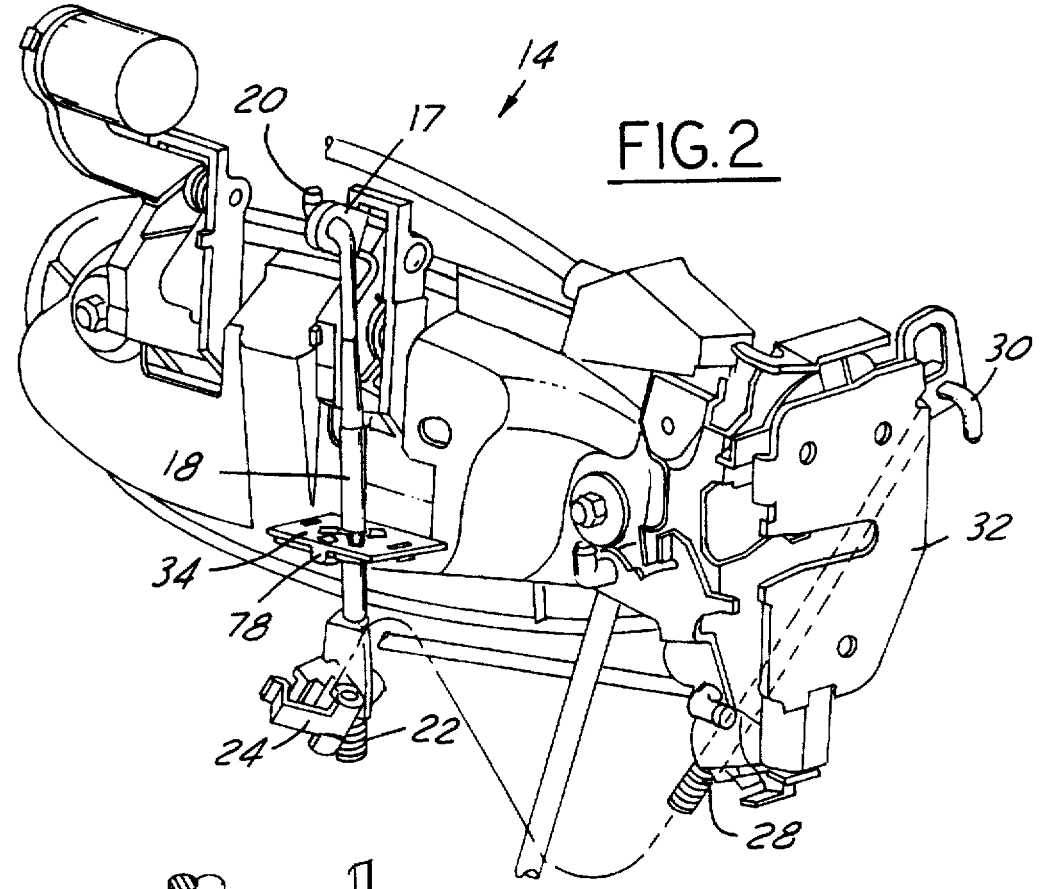
FIG. 2 is a perspective view taken in the general direction of arrow 2 in FIG. 1 within the vehicle door showing construction of a door handle/latch actuator mechanism with a rod guide clip according to an embodiment of the present invention.
Figure 3:
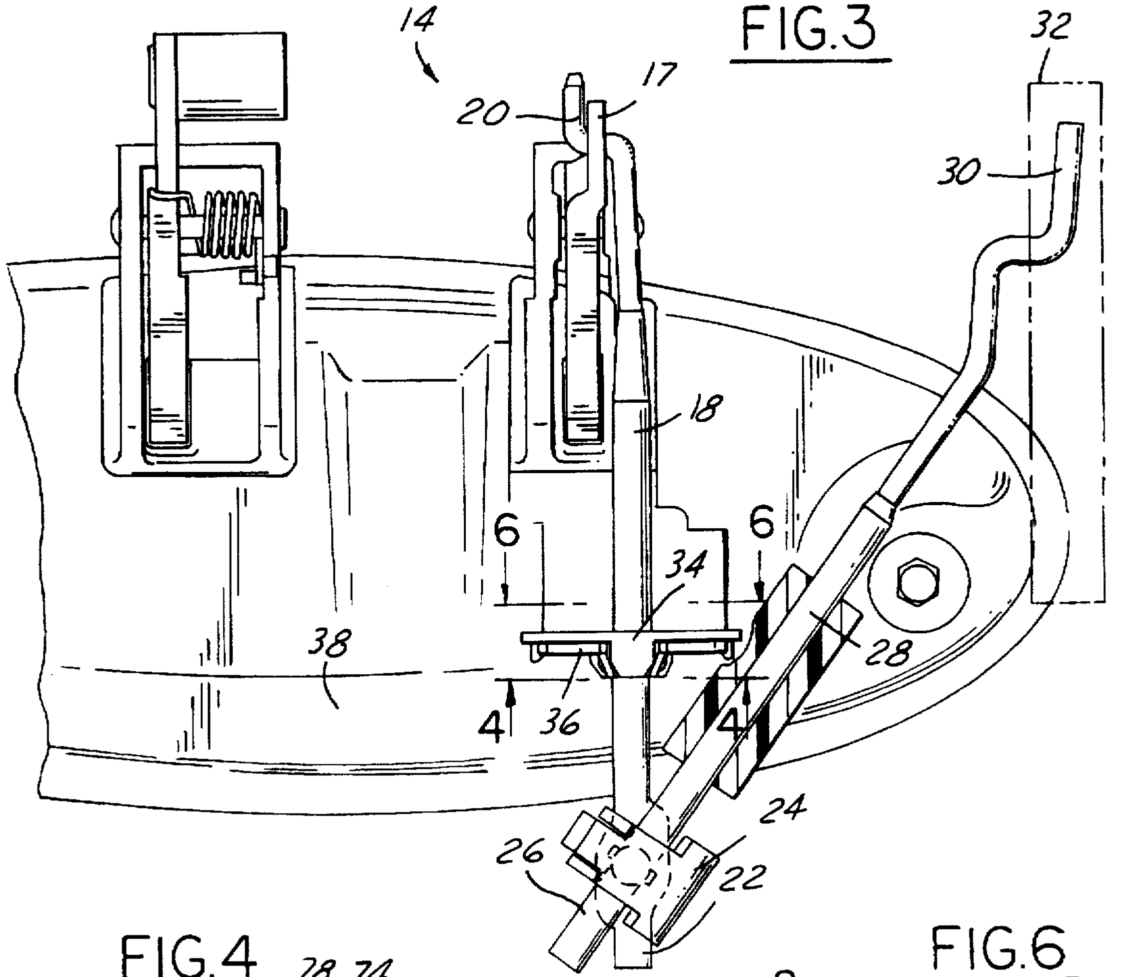
FIG. 3 is a side view of the mechanism of FIG. 2.

Turning now to the drawings, and in particular to FIG. 1 thereof, an automotive vehicle 10 is shown having a pair of vehicle doors 12 with door handles 14 in a typical arrangement for a sedan type vehicle. As is known to those skilled in the art, the door 12 is typically constructed of an outer panel and an inner panel defining a space therebetween (not shown). Within the inner space is typically mounted, for example, a window regulator (not shown) and door handle/latch components, as seen in FIG. 2, which is view of door handle 14 from within the door 12. Operation of the grip 16 from outside the vehicle 10 moves a handle clevis, or lever 17 attached thereto in a downward fashion (FIGS. 2 and 3), which consequently moves a control rod 18 in a downward direction, since it is attached on a first end 20 to the lever 16. On a second end 22 of the control rod 18 is attached a swivable member 24 which receives a first end 26 of a latch actuation rod 28. A second end 30 of the latch actuation rod 28 is connected to a latch 32 (FIGS. 2 and 3) for operation between a latched position connected with a striker on an adjacent vehicle surface (not shown), and a position unlatched from the striker (not shown). Movement of the grip of the door handle 14 operates the control rod 18, which in turn moves the latch actuation rod to either latch or unlatch the latch mechanism 32. The control rod 18 is mounted through a rod guide clip 34 (FIGS. 2 and 3) between ends 20, 22. The rod guide clip 34 is attached to a flange 36 extending from an interior surface 38 of the door handle 14.

Figure 6:
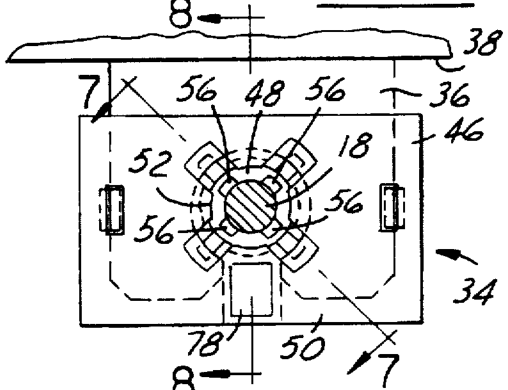
FIG. 6 cross-sectional view of a rod guide clip according to a preferred embodiment the present invention taken along line 6—6 of FIG. 3.
Figure 7:
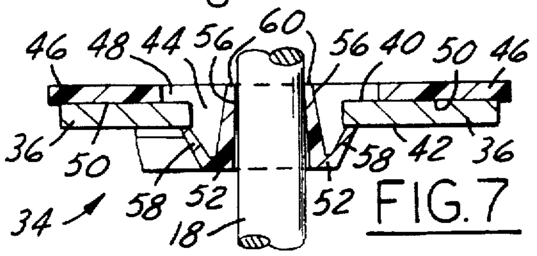
FIG. 7 is a cross-sectional view taken along line 7—7 of FIG. 6.

Referring now to FIGS. 4–8, the rod guide clip 34 of the present invention will be described in further detail. The flange 36 has an upper surface 40, a lower surface 42, and a flange opening 44 for receiving the control rod 18 therethrough (FIG. 7). The clip 34 has a generally planar base member 46 with a base opening 48 therein for receiving the control rod 18 therethrough substantially perpendicular to a mating surface 50 (FIG. 7). The mating surface 50 mates with the upper surface 40 of the clip flange 36. The base opening 48 is axially aligned with the flange opening 44.

Figure 5:
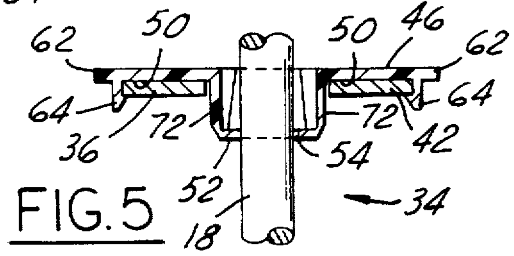
FIG. 5 is a cross-sectional view taken along line 5—5 of FIG. 4.

A ring member 52 is suspended from the mating surface 50 of the base member 46 so as to be positioned below the lower surface 42 of the clip flange 36, and has a ring opening 54 in axial alignment with the base opening 44 (FIGS. 5–7). To bias the control rod 18 within the base opening 48, four flexible fingers are equally spaced circumferentially around the inner diameter of the ring member 52 and extend therefrom to the base opening 48. The biasing contact of the flexible fingers 56 with the control rod prevent rattle and squeak when the vehicle 10 is driven, or when the door 12 is slammed shut. The radially outward flexibility of the fingers 56 also provide for smooth operation of the control rod 18 as it passes through the clip 34 when the door handle 14 is operated to open the door 12. Those skilled in the art will recognize that a greater or lesser number of flexible fingers 56 may be utilized to accomplish the just mentioned advantages, and also that the fingers 56 need not be equally circumferentially spaced, but can be spaced so as to provide a desired biasing force in a particular direction as the door handle 12 design requires.

Figure 4:
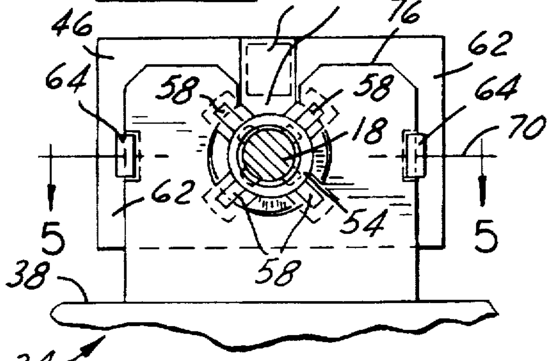
FIG. 4 is a cross-sectional view of a rod guide clip according to a preferred embodiment of the present invention taken along line 4—4 of FIG. 3.

The ring 52 also has four retention tabs 58 circumferentially spaced around an outer diameter thereof (FIGS. 4 and 7). The retention tabs 58 are preferably radially aligned with the flexible fingers 56 and extend from the ring member 52 a predetermined distance so as to contact the lower surface 42 of the clip flange 36 to provide retention support therefor. Those skilled in the art will recognize that the positioning and number of retaining tabs 56 may be varied to provide a desired supporting relationship between the clip 34 and the clip flange 36. As seen in FIG. 7, the retention tabs 58 extend radially away from the control rod, while the flexible fingers 56 are preferably angled radially inward toward the control rod 18 so that tips 60 thereof contact the control rod 18 to provide the aforementioned bias force.

Extending a predetermined distance downwardly from the mating surface 50 on opposite ends 62 of the base member 46 are a pair of clip arms 64 which clip onto the lower surface 42 of the clip flange 36 (FIGS. 4 and 5). Together, the flexible fingers 56, the retention tabs 58, and the clip arms 64, provide retention of the clip 34 to the clip flange 36, as well a bias force onto the control rod 18, both within a common plane, which essentially is the plane of the clip flange 36. Such an arrangement advantageously provides a coplanar reaction force, along the plane of the clip flange 36, against lateral movement of the control rod 18. That coplanar force thus acts perpendicular to movement of the control rod 18 when moving through the clip 34.

As seen in FIGS. 4 and 6, the flexible fingers 56 and the retention tabs 58 are circumferentially spaced 90° apart around the base opening 48 and the flange opening 44, and are preferably oriented 45° off an axis 70 (FIG. 4) between the clip arms 64. It is believed that such an arrangement provides additional stability for the clip 34 due to multidirectional retention of the clip 34, coupled with multidirectional resistance to control rod 18 movement.

Further, clip 34 stability is afforded by suspension members 72 (FIG. 5) which serve to suspend the ring member 52 from the base member 46. Preferably, the suspension members 72 are radially opposed and are in abutting relationship with the clip flange 36 as they pass through the flange opening 44 (FIG. 5).

Figure 8:
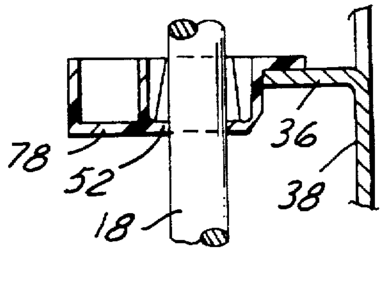
FIG. 8 is a cross-sectional view taken along line 8—8 of FIG. 6.

In a preferred embodiment, the clip flange 36 has a slot 74 on an edge 76 away from the handle inner surface 38 (FIG. 4) to allow the clip 34 to slide onto the flange 36 during assembly. To assist in assembly and to further prevent clip 34 movement with respect to the clip flange 36, the base member 46 has a knob 78 descending from the mating surface 50 which slides into the slot 74 (FIGS. 4, 6, and 8). The knob 78 substantially fills the slot 74 when the clip member 34 is attached to the clip flange 36. Preferably, the knob 78 is connected to the ring member 52 (FIG. 8).

The clip 34 can be made of any suitable material, for example, an acetal material. The components of clip 34, including the base member 46, the flexible fingers 56, the retention tabs 58, the clip arms 64, the knob 78, and the ring member 52 are integrally molded as a single piece.

Assembly of the clip member 34 to the control rod 18 is accomplished by subassembling the control rod 18 through the clip 34, then installing the rod 18 to the lever 17, and finally snapping the clip 34 onto the door flange 36.

Although the preferred embodiment of the present invention has been disclosed, various changes and modifications may be made without departing from the scope of the invention as set forth in the appended claims.

We claim:

1. A rod guide clip for a door of an automotive vehicle having a door handle with a control rod attached thereto for operation of a door latch, the clip comprising:

a base member with a generally planar surface having an opening therein for receiving the control rod substantially perpendicular therethrough;

a plurality of flexible fingers circumferentially spaced around the opening and extending thereinto from the base member for biasing contact with the control rod;

a plurality of retention tabs on the base member, circumferentially spaced radially outward of the plurality of flexible fingers for contact with a mating portion of the vehicle;

a pair of clip arms extending away from the surface of the base member for clipping relationship with the mating portion of the vehicle; and wherein the plurality of flexible fingers, the plurality of retention tabs, and the pair of clip arms are located in a generally common plane so as to provide a coplanar reaction force against lateral movement of the control rod perpendicular to the base member.

2. A rod guide clip for an automotive vehicle door having a door handle with a control rod attached thereto for operation of a door latch, the clip comprising:

a generally planar base member having a base opening therein for receiving the control rod therethrough substantially perpendicular to a mating surface;

a ring member suspended from the mating surface with a ring opening in coaxial alignment with the base opening;

a plurality of flexible fingers circumferentially spaced around an inner diameter of the ring member and extending from the ring member to the base opening in biasing contact with the control rod;

a plurality of retention tabs circumferentially spaced around an outer diameter of the ring member and extending toward the mating surface a predetermined distance therefrom for clipping relationship with a mating portion of the vehicle;

a pair of clip arms, on opposite ends of the base member, extending the predetermined distance away from the mating surface for clipping relationship with the mating portion of the vehicle; and wherein the plurality of flexible fingers, the plurality of retention tabs, and the pair of clip arms are located in a generally common plane so as to provide a coplanar reaction force against lateral movement of the control rod perpendicular to the base member.

3. A rod guide clip assembly for a door of an automotive vehicle having a door handle with a control rod attached thereto for operation of a door latch, the clip assembly comprising:

a clip flange extending from the door and having a flange opening therethrough, and an upper surface and a lower surface; and a clip member comprising:

a generally planar base member having a base opening therein for receiving the control rod therethrough substantially perpendicular to a mating surface for mating with the upper surface of the clip flange, the base opening axially aligned with the flange opening;

a ring member suspended from the mating surface, below the lower surface of the door clip flange, with a ring opening in axial alignment with the base opening;

a plurality of flexible fingers circumferentially spaced around an inner diameter of the ring member and extending from the ring member to the base opening in biasing contact with the control rod;

a plurality of retention tabs circumferentially spaced around an outer diameter of the ring member and extending toward the lower surface of the door clip flange a predetermined distance for retaining relationship therewith;

a pair of clip arms, on opposite ends of the base member, extending the predetermined distance away from the mating surface for clipping relationship with the lower surface of the clip flange; and wherein the plurality of flexible fingers, the plurality of retention tabs, and the pair of clip arms are located in a generally common plane so as to provide a coplanar reaction force against lateral movement of the control rod perpendicular to the base member.

4. A rod guide clip assembly according to claim 3 wherein the ring member is suspended from the base member by at least two radially opposed suspension members in abutting relationship with the flange opening.

5. A rod guide clip assembly according to claim 4 wherein the clip flange has a slot in communication with the flange opening to allow the clip member to slide therein during assembly.

6. A rod guide clip assembly according to claim 5 wherein the base member has a knob descending from the mating surface for cooperation with the slot during positioning of the clip member onto the clip flange.

7. A rod guide clip assembly according to claim 6 wherein the knob substantially fills the slot when the clip member is attached to the clip flange.

8. A rod guide clip assembly according to claim 6 wherein the knob is connected with the ring member.

9. A rod guide clip assembly according to claim 3 wherein the plurality of retention tabs are radially aligned with the plurality of flexible fingers.

* * * * *